MAUJ A COHLY
INVENTOR.

Aug. 25, 1970  M. A. COHLY  3,525,628
ALUMINUM TANNAGE OF EDIBLE COLLAGEN CASING
Filed Nov. 20, 1967  2 Sheets-Sheet 2

MAUJ A COHLY
*INVENTOR.* his attorney

United States Patent Office 3,525,628
Patented Aug. 25, 1970

3,525,628
ALUMINUM TANNAGE OF EDIBLE COLLAGEN CASING
Mauj A. Cohly, Catlin, Ill., assignor to Tee-Pak, Inc., Chicago, Ill.
Filed Nov. 20, 1967, Ser. No. 684,380
Int. Cl. A22c 13/00; D01f 9/04; B29d 23/04
U.S. Cl. 99—176       13 Claims

ABSTRACT OF THE DISCLOSURE

An edible sausage casing having improved strength, bite, stuffing, linking, and cooking characteristics is prepared from hide collagen. Animal hides are limed to swell and dehair the hide, split to produce a collagen containing corium layer and then neutralized in dilute acid. The neutralized hide is ground into fine particles, formed into a slurry, and swollen with weak acid to produce an extrudable collagen paste or slurry having a solids content of about 2–6%. Alternatively, the collagen slurry may be prepared by acid or enzymatic or mechanical depilation of the hide, followed by grinding and acid swelling. The slurry is extruded through an annular die, coagulated with ammonium sulfate or sodium sulfate and tanned in a tanning bath or solution containing an olated basic aluminum salt complexed with an organic acid or salt of an organic acid. The tanned casing, containing about 1.5–5.0% aluminum is washed and finally plasticized with an aqueous solution of glycerin or similar plasticizer. The casing is dried and reeled and eventually shirred on a commercial shirring machine for delivery to the meat packer in a shirred and packaged form.

BACKGROUND OF THE INVENTION

Natural casings are prepared from the intestines of various edible animals, primarily cattle, hogs and sheep. The intestines are removed from the slaughtered animal and thoroughly cleaned by processes well known in the art. Natural casings, which have been thoroughly cleaned, are stuffed with various sausage meat compositions and formed into sausage links in preparation for cooking. The sausages which are thus formed are cooked by the consumer and the sausage casings eaten with the cooked sausage. In the preparation of certain smoked or precooked sausages, such as frankfurters and the like, the sausage is cooked or smoked or otherwise processed by the meat packer to render it edible without further treatment by the consumer.

Prior to about 1925, substantially all sausage casings were natural casings prepared from animal intestines. Since that time, there have been developed several types of synthetic sausage casings, primarily of regenerated cellulose, which are used in the preparation of the major portion of sausages which are made and sold today. Cellulose casings are used in the preparation of large sausages, such as bolognas, salamis, and the like, and are removed from the sausage by the cocnsumer at the time of final preparation for eating. Regenerated cellulose casings are also used in the preparation of frankfurter sausages wherein the casing is stuffed with sausage emulsion, linked, smoked, and cooked, and the casing then removed from the finished product.

Regenerated cellulose casings have not proved satisfactory for the processing of pork sausages inasmuch as cellulose is not edible with the sausage and does not transmit the fat which is released from the sausage during cooking. As a result, there has been some demand for an artificial sausage casing which is edible and which has the properties desired in a casing to be used in the processing of pork sausages.

Over a period of many years, synthetic sausage casings have been prepared from animal collagen. Casings made of collagen have been prepared by processing animal hide to break the collagen into a fibrous structure and extrude the collagen fibers in the form of a doughy mass to produce tubular casings. The casings which have been prepared in this manner have been hardened with formaldehyde and have been used as a removable casing for processing various sausages. These casings have not been edible even though collagen itself is an edible material.

More recently, edible sausage casings of collagen have been prepared and sold in commercial quantities. In the manufacture of edible collagen casings, considerable emphasis has been placed on the necessity for using collagen source materials which have not been subjected to a liming treatmment. In fact, a number of recent patents describing the production of collagen casings have indicated that it is absolutely necessary to start with an unlimed collagen source material if an edible casing is to be obtained. While the use of unlimed collagen as a starting material has certain advantages, it has the substantial disadvantage of requiring a more severe mechanical treatment for removal of hair and the epidermal layer from the hides from which the collagen is obtained.

In the co-pending patent application of Robert D. Talty and Mauj A. Cohly, Ser. No. 442,885, filed Mar. 26, 1965, now U.S. Pat. No. 3,408,918 a process is described in which edible collagen casings are prepared from limed hide collagen In that process, animal collagen is obtained from limed hides which are subsequently subjected to an acid deliming process. In the co-pending patent application of Robert D. Talty, Ser. No. 471,645, filed Sept. 13, 1965, now U.S. Pat. No. 3,425,846 a process is described for the preparation of edible collagen casings from limed hides which may be subjected to an acid deliming process or which may be converted directly into a collagen paste and casings formed without the acid deliming step, provided that the collagen is processed into casing at a sufficiently high speed.

In the preparation of edible collagen casings, hide collagen is converted into a finely divided fibrillar form and extruded in the form of a dilute slurry, e.g. 2–6% collagen ccontent. The extruded collagen is passed into a sodium sulfate and/or ammonium sulfate coagulating bath which dehydrates the collagen slurry and forms a coherent collagen film.

At this stage in the processing, however, the salt coagulated collagen film can be handled but will revert to a thin slurry upon further contact with water. It is therefore necessary to harden or tan the extruded collagen film to permit further processing of the film and to provide the film with sufficient strength for use as a sausage casing. A satisfactory tanning process must utilize a tanning agent which is very rapid in tanning action and completely non-toxic in the form in which it is present in the finished casing and must produce a casing of sufficient strength to be stuffed with sausage meat, linked, packaged, and finally cooked.

In the preparation of collagen casings, Seiler U.S. Pat. 3,123,481 discloses the hardening or tanning of collagen casing using an alum tanning bath. In the Seiler process, alum solutions are used ranging from 3–18% aluminum ammonium sulfate, calculated as the commercially available ammonium alum hydrate. These tanning solutions are treated with citric acid and adjusted to a pH in the range from about 3.5–5.0. The amount of aluminum incorporated into the casing in the tanning process is related to the aluminum content of the tanning solution and is limited seriously by the relatively low solubility of alum. Seiler states that the casing tanned by his process contains 0.3–1.1% wt. aluminum. In the Seiler process it is not possible to produce casings having a higher aluminum content due to the low solubility of alum and the inefficiency of alum as a tanning agent for collagen.

STATEMENT OF OBJECTS AND FEATURES OF THE INVENTION

It is therefore one object of this invention to provide a new and improved process for the preparation of edible collagen casings from limed or unlimed hides utilizing a novel aluminum tannage of the collagen.

Another object of this invention is to provide a new and improved edible collagen casing prepared from limed or unlimed hides having a higher aluminum content than prior aluminum tanned casings.

A feature of this invention is the provision of an improved process for preparing edible collagen casings from limed or unlimed hides in which the collagen is converted into a slurry for extrusion, coagulated, and tanned in a tanning solution containing an olated basic aluminum salt complex.

Another feature of this invention is the provision of a new and improved edible collagen casing prepared from limed or unlimed hides and tanned in a solution of an olated basic aluminum salt complex, the casing being characterized by improved strength and having an aluminum content in the range from about 1.5–5.0%.

Other objects and features of this invention will become apparent from time to time throughout the specification and claims as hereinafter related.

SUMMARY OF THE INVENTION

This invention is based upon the discovery that improved edible collagen casings can be prepared using limed or unlimed hides as the source of collagen using an improved tanning process. The collagen is obtained as a corium split from animal hides and is comminuted to fine particle size and swollen with acid to burst the collagen fibers. The swollen collagen is diluted to a slurry having a collagen content in the range from about 2–6% and extruded into a suitable coagulating bath. The extruded coagulated casing is then tanned in a tanning bath comprising a solution of an olated basic aluminum salt complex. The tanned casing is washed and finally plasticized with a glycerin solution. The casing is then dried, reeled, and eventually shirred and packaged.

BRIEF DESCRIPTION OF THE DRAWINGS

The process for preparation of casings in accordance with this invention will be understood more fully by reference to the following description and the accompanying drawings, in which.

DESCRIPTION OF THE PREFERRED EMBODIMENTS

Figure 1:
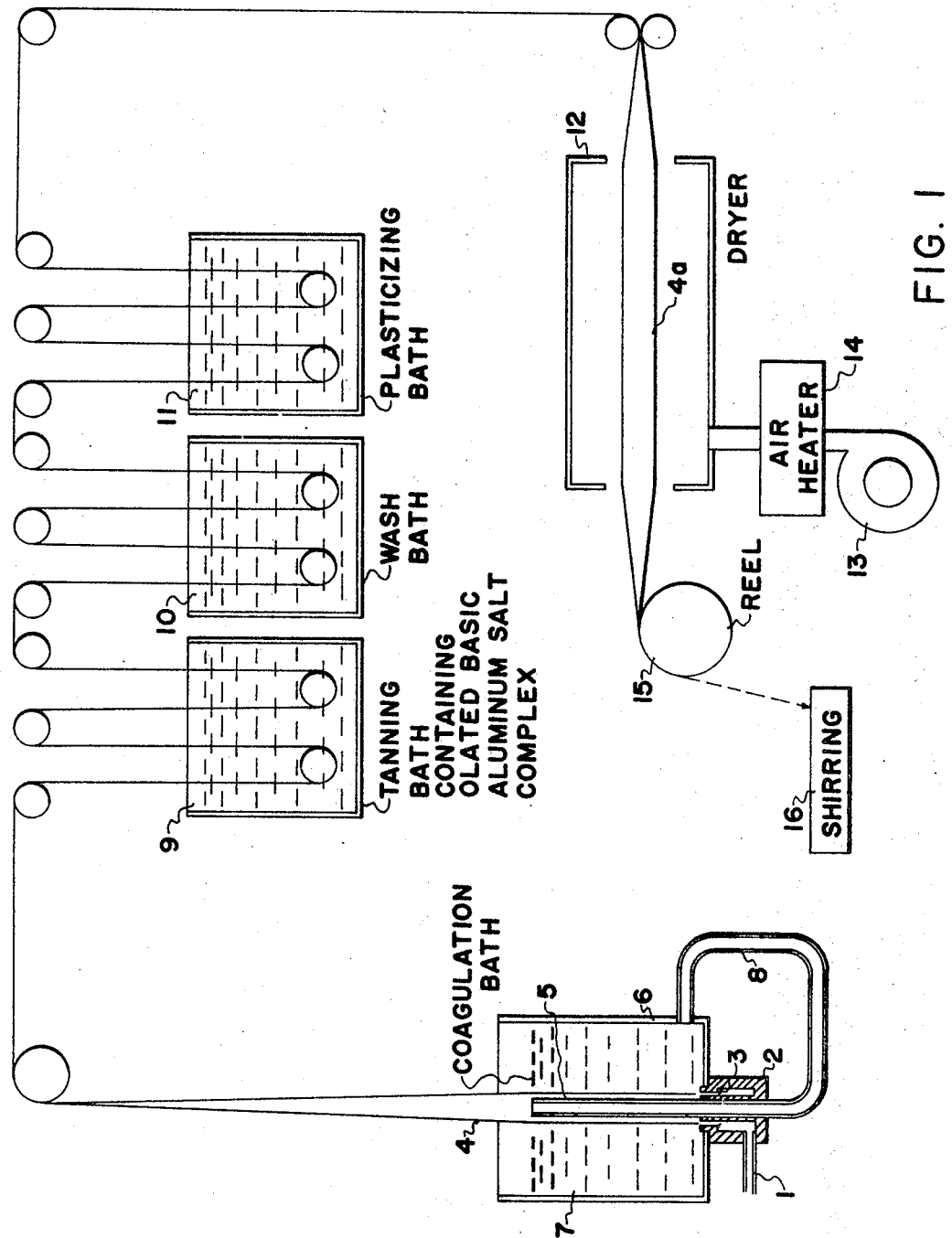
FIG. 1 is a flow diagram illustrating schematically the more important steps in the extrusion, tanning, and processing of edible collagen casings.

Collagen tissues which are suitable for the preparation of extruded collagen casings are obtainable from hide and tendon, although hide collagen is preferred for casing manufacture. Collagen is formed of a large number of fibers which in turn consist of a much greater number of fibrils of sub-microscopic size. Collagen fibrils have a diameter of the order of 10–15 angstroms and lengths ranging from several thousand to several million angstroms. Recent patents describing the production of edible collagen casings have emphasized the necessity of using collagen source materials which have not been subjected to a liming treatment for the reason that the liming treatment allegedly prevents the bursting of the collagen fibers to release the fibrils which is necessary for the formation of fibrillar forms. More recently, it has been found that satisfactory edible collagen casings can be prepared using either limed or unlimed collagen as the source material for the preparation of the casing. If unlimed collagen is to be used in the preparation of an edible collagen casing, the unlimed hide, either fresh, frozen, or salt-cured, is defleshed and the hair and the epidermal layer mechanically removed, e.g. by abrading, scraping, splitting, etc. The hide is then cut into small pieces and passed through a meat grinder until reduced to a very small size. The ground collagen is then swollen in a solution of an organic acid such as lactic acid or citric acid to produce a slurry having a 2–6% collagen content.

The collagen slurry is extruded through an annular die into a coagulating bath consisting of a concentrated solution of sodium sulfate and/or ammonium sulfate. The resulting tubular collagen film is then passed into a hardening or tanning bath and is washed, dried, shirred, and packaged.

If the collagen to be used in the preparation of edible casing is derived from limed animal hides, some variation in the above procedure is required. An animal hide is treated to remove the blood quickly, fleshed, and cut into suitable pieces (hide trimmings may also be used) for the subsequent liming treatment. The hide pieces are treated with a suitable lime solution for removal of hair. The lime solution may be simply a saturated solution of lime containing excess solid lime, or may be a solution containing excess solid lime together with sodium sulfhydrate and/or dimethylamine sulfate.

After treatment in such a solution for a period for less than two days (3–12 hours or less is preferred), the hides are removed and washed. After washing, the hides are split or otherwise mechanically abraded to remove the epidermal layer and any remaining hair. If desired, the hide may be neutralized by treatment with a non-toxic acid, at a pH of about 2.5–6.5, to form soluble calcium salts. The neutralized hide is washed sufficiently to remove most of the by-product salts. The hide may be split or mechanically dehaired to remove residual hair and the epidermal layer either before or after neutralization. The treated hide is then cut into small pieces and ground at a temperature less than about 20° C. (usually with admixture of ice) into a finally divided form and mixed with sufficient additional water to produce a slurry having a collagen content in the range from about 2–6%, preferably about 3.5–5%.

The collagen slurry which is thus produced is treated with a weak acid, such as citric acid or lactic acid, to cause the collagen fibers to swell and burst, thus releasing the collagen fibrils and destroying the identity of the individual fibers. The best results are obtained by carrying out the washing, dehairing, grinding, and acid swelling of the collagen in less than 48 hours and preferably less than 12 hours.

The swollen collagen slurry is then extruded through an annular die to produce thin-walled product suitable for use as sausage casings after tanning and further processing. In order to obtain maximum strength in the product casing, the collagen slurry is preferably extruded through a die having counter-rotating inner and/or outer parts, which is well known in the prior art in the preparation of collagen casings, as shown in Becker U.S. Pat. 2,046,541.

The collagen slurry is extruded through the die into a coagulating bath consisting of concentrated solution of sodium sulfate or ammonium sulfate. The extruded collagen tube which is formed in the coagulating bath is then passed into a tanning or hardening bath comprising a solution of olated basic aluminum salt complex, and is subsequently washed and plasticized [a description of olation and related chemical processes is found The Chemistry of the Coordination Compounds, John C. Bailar, Jr., Reinhold Publishing Corp., 1956, pp. 448–

471]. The tanned and plasticized casing is inflated with air or other gas and passed through a dryer, after which the casing is either rolled up on reels or passed onto a shirring machine where it is shirred into short strands. The casing may be shirred on machines of the type shown in U.S. Pats. 2,722,714; 2,722,715; 2,723,201 or 3,122,517, or the like.

In FIG. 1 of the drawings, the steps from extrusion through reeling or shirring are illustrated schematically in slightly more detail. The collagen slurry is introduced through inlet conduit 1 into die 2 having an annular die outlet 3 through which casing 4 is extruded. The die 2 has an inner tube 5 which extends upwardly within the extruded casing to remove coagulating bath from within the extruded casing. The die 2 is located at the bottom of container 6 which contains a coagulating bath 7. Coagulating bath 7 is circulated through conduit 8 from tube 5 for removal of the coagulating bath from inside the extruded casing. Casing 4 which is coagulated in the bath 7 passes over a series of rollers and is directed through a tanning bath 9.

Tanning bath 9 consists of an aqueous solution of an olated basic aluminum salt complex having a pH of about 3–7. From tanning bath 9, the casing passes through a wash bath 10 where unreacted tanning reagent is washed out of the casing. The casing is then passed through plasticizing bath 11 which introduces a small amount of a plasticizer, such as glycerin, into the casing. From the plasticizing bath 11, the casing passes through dryer 12 where it is inflated as indicated at 4A and dried with air or other gas circulated by fan or blower 13 through air heater 14.

After leaving dryer 12, the casing 4 may be collapsed and rolled up on reel 15 from which it is subsequently removed for shirring. In an alternate embodiment of this process, the casing may be passed directly to the shirring machine shown diagrammatically as 16. The shirring machine which is used for preparation of shirred strands of casing may be of any suitable design such as the types commonly used in the shirring of regenerated cellulose sausage casing as noted above.

Figure 2:
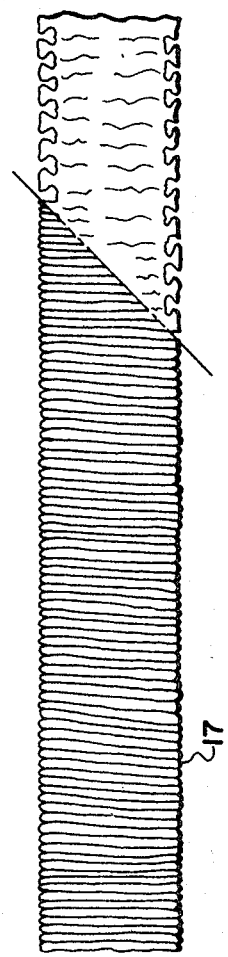
FIG. 2 is an extruded edible collagen casing prepared in accordance with this invention, as processed in a shirred form.
Figure 3:
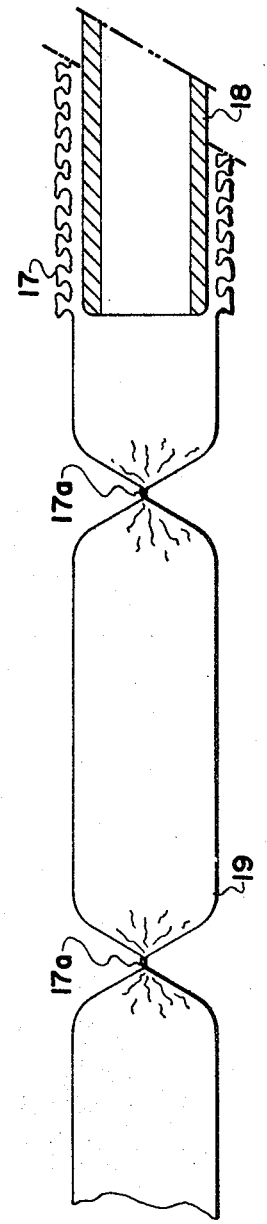
FIG. 3 is a schematic view showing the filling of the casing with sausage meat on an extrusion horn or nozzle and the preparation of sausage links therefrom.

After the casing is shirred into individual short strands it is packaged and delivered to the meat packer. In FIG. 3, the stuffing of the casing is illustrated. A strand of edible collagen casing 17 (also shown in detail in FIG. 2) is placed on a tubular stuffing horn 18 which is connected to a pressurized source of sausage emulsion (not shown). The sausage emulsion is passed through stuffing horn 18 into the end of casing 17 and the casing is filled with sausage meat and twisted at suitable intervals, as indicated at 17A, to provide sausage links 19. The links may be severed from each other and packaged in a suitable overwrap following conventional meat packaging techniques. When the sausage is cooked by the consumer, the casing is found to be quite strong and shrinks with the meat during cooking. The casing may be pre-stuck, if desired, to permit more rapid release of fat during the cooking of the sausages. Casing which is prepared in this manner has been found to have a shrinkage temperature which is equal to or greater than native collagen and thus does not shrink excessively during cooking.

The following non-limiting examples are illustrative of the application of this invention to the preparation of a satisfactory translucent or transparent edible collagen casing:

EXAMPLE 1

In this example, collagen casing is prepared and tanned with a high aluminum content tanning bath. The tanning bath used is one containing an olated basic aluminum salt complex. The tanning bath is prepared by dissolving an aluminum salt, such as aluminum sulfate, aluminum nitrate, aluminum chloride, etc., is dissolved in deionized water or softened water and is treated with an organic complexing agent such as citric acid, tartaric acid, acetic acid, etc. or salts thereof to produce an aluminum salt complex. The organic complexing reagent is preferably one which forms a stable complex or chelate with aluminum and is added in the ratio of about 1–2 moles of the complexing reagent per atom of aluminum. After the complex is formed, the solution is treated with a basic salt such as sodium carbonate or a weak base such as barium hydroxide to render the aluminum salt complex partially basic. The tanning solution which is thus prepared consists of an olated one-third to two-thirds basic aluminum salt complex.

Selected cattle hides from carcasses certified fit for human consumption, weighing about 65–75 pounds each, are used as the starting material for this process. As soon as possible after flaying and inspection, the hides are washed in a large volume of circulating cool (10° C.) water to remove adhering blood. After washing, the hides are fleshed fresh, without curing to remove adhering fatty muscular debris from the flaying operation.

The washed and fleshed hides are then treated in a liming bath containing 6% wt. of fresh calcium hydroxide and 1.5% wt. of sodium sulfhydrate (the liming bath may contain up to 3% dimethylamine sulfate), as solution and/or slurry contained in about 450% wt. of water at room temperature (15–20° C.), all percentages being calculated on the weight of the hide treated. The treatment is carried out for a period less than about 6 hours, sufficient to remove most of the hair from the hide, and the hides are gently agitated from time to time to insure even penetration of the liming liquor.

After liming, the hides are removed from the liming bath and permitted to drain for a period of about one-half hour while suspended. The limed hides are gently squeezed, as between rubber rollers, to remove excess liming liquor.

The hides which have been thus limed, drained and squeezed, are then cut or split in the plane of the hide into two approximately equal portions by weight. The upper or outer hide surface contains all of the hair, hair follicles, and sebaceous and sudorific glands. The inner or corium layer consists substantially of collagen. The outer or hair containing layer or split is discarded as unsuitable for use in the preparation of casing but may be used for formation of leather laminates or coverings.

The corium layer or split is then placed in a tank or vat containing about 4.5 times the hides weight of water at a temperature less than about 15° C. Gentle agitation is used to insure even removal of debris and adhering lime solution and/or slurry. The hides are washed during a period of 20–30 minutes. The washings are removed and the corium splits resuspended in 4.5 times their weight of cool (15° C.) water. Edible grade lactic acid, suitably diluted at a concentration of 2–4 ounces of 44% lactic acid per quart of cool (15° C.) water is added in small portions at fifteen minute intervals, with gentle agitation for five minutes of each fifteen period. The liquor is tested for pH before each addition, and the end point is regarded as the point when the pH is permanently depressed below 7.0. In general, this requires about 1.5% of the 44% lactic acid, based on the weight of the corium splits. This treatment is effective to neutralize the excess lime in the corium layer and to remove it as a soluble salt. The rate of addition of the lactic acid solution is carefully regulated so that the temperature of the bath is never permitted to rise above 32° C.

The neutralized and deliming corium splits are then removed from the neutralization bath, drained and rinsed in cool (15° C.) water, packed into polyethylene bags which are in turn placed in 50 gallon fiber drums. Dry Ice in sufficient quantity is placed above and below the polyethylene bags to chill the prepared collagen and to maintain it below 5° C. during storage and/or shipment prior to comminution and acid swelling operations prior to extrusion. It should be noted, however, that the hides may, if desired, be cut into small pieces or small pieces of scrap hide material may be used in the steps of liming, splitting, and the neutralization or deliming.

The delimed corium splits are cut into small square or rectangular sections, e.g. ¼ to 4 inches of a side, in preparation for grinding. The small pieces of treated hide are converted to a fine pulp by successive passes through a meat grinder. In this grinding operation, sufficient ice is mixed with the hide splits to maintain the temperature below about 20° C. (and preferably below about 10° C.). The successive passes through the meat grinder use successive smaller dies, the smallest being about 3/64 inch. At this point, sufficient water is added to the pulp to produce a mixture consisting of about 90% water and 10% collagen.

The collagen pulp is then treated with sufficient dilute lactic acid (other dilute or weak acids such as citric or acetic acid may be used) to produce a pH of about 2.5–3.7. The acid is usually added as a dilute solution, e.g. about 0.8–2.0%. After thorough mixing, the pulp and acid are stored overnight at a temperature of about 3° C. to swell. At the end of this time the collagen is swollen and has taken up all of the water in the slurry. The swollen collagen is mixed with sufficient water and acid to maintain the pH of 2.5–3.7, thus producing a thin homogeneous paste consisting of about 4% collagen and 1.2% lactic acid.

The swollen collagen slurry is passed through a homogenizer to further disperse the fibers and then is filtered to remove any undispersed fiber clumps or other solid contaminates. The paste is generally deaerated by storage under vacuum prior to extrusion. The process, from washing of the limed hide through the acid swelling of the comminuted collagen, is preferably carried out in a period of about 6–12 hours (and generally no longer than 48 hours).

The homogenized and filtered collagen slurry is then pumped under pressure through the extrusion die as previously described, into a coagulating bath consisting of about 40% ammonium sulfate (sodium sulfate can also be used) in water. When the collagen is extruded as a thin-walled tube into this concentration of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and to insure proper coagulation of the casing both on the inside and outside.

After the film is coagulated in the ammonium sulfate solution, it is necessary to tan the film to give the film sufficient strength for further processing and for stuffing with the sausage meat. The casing therefore passes next into a tanning bath prepared as described above. The tanning bath is prepared initially from 10–20% aluminum sulfate and is complexed with 3–7% sodium citrate and finally partially neutralized or rendered one-third to two-thirds basic by heating with 3–7% sodium carbonate. The tanning solution consists of a one-third to two-thirds basic, olated, aluminum citrate complex. The tanning bath has a pH of about 4.0 and permits the use of aluminum concentrations for tanning which are substantially greater than the concentrations available with other aluminum tanning baths, such as conventional alum tanning baths.

After tanning, the casing passes through a wash bath and finally through an aqueous solution of a plasticizer, such as glycerol. Other equivalent plasticizers such as sorbitol, dipropylene glycol, triethylene glycol etc. may be used. The plasticizing bath introduces a substantial amount of the desired plasticizer into the casing, which prevents it from becoming hard and brittle after drying. If desired, the casing may be subjected to an auxiliary tanning solution, consisting of a dilute solution of glutaraldehyde in water, prior to plasticizing, also, if desired the plasticizing bath may have a small amount of a fatty vegetable material such as a fatty monoglyceride emulsified therein to provide improved softness and improved cooking characteristics in the finished casing.

From the plasticizing bath, the casing passes through a dryer where it is inflated and dried with the aid of heated air circulated by fan or blower as previously described. Upon leaving the dryer, the casing is partially rehumidified, rolled up on reels, and then shirred on a machine similar to the type used in the shirring of regenerated cellulose casings. Alternatively, it is possible to shirr the casing directly out of the dryer. After the casing is shirred into individual short lengths, it is packaged into suitable cartons for delivery to the customer.

The composition of the final product casing is approximately as follows:

|  | Percent |
|---|---|
| Collagen | 74 |
| Glycerin | 14 |
| Water | 9 |
| Aluminum | 2 |
| Fat | 1 |
| Total | 100 |

The several washing steps in this process are effective to remove essentially all of the reagents used in liming the hide and in hardening or tanning of the extruded casing, with the exception of minor amount of calcium (less than about 0.5%) and aluminum (about 2%) which is chemically bound in the collagen. The aldehyde treatment, which is option, does not leave any residue of free aldehyde.

When this casing was used by a commercial meat packer in a shirred form as illustrated in FIG. 2 and stuffed with sausage meat and formed into links as shown in FIG. 3, a satisfactory product was obtained. The casing was found to function well in stuffing and was formed easily by the linking machine into the desired sausage links. When the sausages were cooked the casing was found to shrink with the meat and to release fat cooked out. There was no excessive tendency of the casing to split or stick to the frying pan during cooking.

EXAMPLE 2

A series of experiments were carried out in which the concentration of $Al_2(SO_4)_3$ in the tanning bath was varied to evaluate the effect on aluminum content in the finished casing. The results of several experiments are tabulated below:

TABLE I

| Run No. | Percent $Al_2(SO_4)$ in Tanning Bath | Percent basicity of Tanning Bath | pH of Tanning Bath | Percent Al in Casing |
|---|---|---|---|---|
| A | 5 | 40 | 3.20 | 1.60 |
| B | 10 | 40 | 3.55 | 2.64 |
| C | 15 | 40 | 3.60 | 3.15 |

In each of runs A, B, and C the baths were prepared and the casing processed as described in Example 1. The casing obtained was easy to skin, stuff, link, and cook.

EXAMPLE 3

In this example, the process was varied by using a tanning bath prepared from aluminum chloride. The tanning bath is prepared by dissolving aluminum chloride in deionized or softened water and treated it with sodium citrate to produce an aluminum salt complex. The aluminum citrate complex is then treated with sufficient sodium carbonate to render the complex two-thirds basic. The olated two-thirds basic aluminum citrate complex which is thus formed is used as described in Example 1 in the tanning bath used for hardening the casing.

When the casing is prepared as described in Example 1 using this tanning bath as a substitute for the tanning bath described in that example, the casing which is obtained is easy to shirr, stuff, link, and cook.

This process, as exemplified by Examples 1 and 2, may be used in tanning or hardening collagen casing prepared from unlimed hides or from hides which have been limed and subsequently delimed, or from hides which have been acid swollen and split, or from hides which have enzymatically dehaired. By a proper selection of the aluminum salt and complexing the salt and rendering it one-third to two-thirds basic it is possible to produce aluminum tanning solutions which will result in aluminum contents ranging from about 1.5 to 5% in the finished casing.

While this invention has been described fully and completely with special emphasis upon several preferred embodiments, it should be understood that within the scope of the appended claims the invention may be practiced otherwise than as specifically described herein.

What is claimed is:

1. A method of preparing an edible tubular collagen casing which comprises:
    (a) treating fresh or frozen or salt cured animal hide to remove the flesh, and fatty and muscular debris,
    (b) mechanically splitting the hide to remove the hair and epidermal layer,
    (c) grinding the corium split at a temperature less than about 20° C. to produce a slurry of finely divided collagen in water,
    (d) treating the slurry with acid at a pH of 2.5–3.7 to swell the collagen,
    (e) extruding the slurry through an annular die into a coagulating bath to form a collagen tube,
    (f) passing the collagen tube through a tanning solution comprising a one-third to two-thirds basic, olated, aluminum organic acid salt complex in a concentration sufficient to produce an aluminum content in the finished casing in excess of about 1.5%, and
    (g) washing, plasticizing and drying the tube to produce a translucent, non-fibrous, edible product.

2. A method in accordance with claim 1 in which the tanning solution is prepared by dissolving an aluminum salt in water, treating the aluminum salt solution with an organic acid complexing agent or salt thereof at a temperature and for a time sufficient to produce an aluminum salt complex and then treating the complex with sufficient amount of a weak base to render the salt complex one-third to two-thirds basic.

3. A method in accordance with claim 2 in which the aluminum salt is aluminum sulfate, aluminum nitrate, or aluminum chloride.

4. A method in accordance with claim 2 in which the aluminum complex is treated with sodium carbonate to render the complex one-third to two-thirds basic.

5. A method in accordance with claim 1 in which the animal hide is treated with a lime containing solution for a time sufficient to at least partially dehair the hide, and is then throughly washed to remove excess lime prior to mechanical splitting.

6. A method in accordance with claim 1 in which the animal hide is subjected to treatment with dilute acid to partially depilate the hide prior to mechanical splitting.

7. A method in accordance with claim 1 in which the slurry contains 2–6% collagen.

8. A method in accordance with claim 1 in which the coagulating bath comprises a substantially saturated solution of an alkali metal sulfate or ammonium sulfate.

9. A method in accordance with claim 1 in which the tanning bath is prepared by forming a solution of 10–20% aluminum sulfate and complexing the same with 3–7% sodium citrate and then treating the citrate complex with 3–7% sodium carbonate at a temperature and for a time sufficient to produce a one-third to two-thirds basic, olated, aluminum complex.

10. A method in accordance with claim 1 in which the product casing is shirred.

11. An edible translucent sausage casing comprising cohered limed or unlimed hide collagen fibrils tanned with a one-third to two-thirds basic, olated aluminum complex, and containing at least 1.5% aluminum.

12. A sausage casing in accordance with claim 11 in a shirred condition.

13. An edible sausage comprising a sausage casing in accordance with claim 11 stuffed with a sausage meat.

References Cited

UNITED STATES PATENTS

| | | | |
|---|---|---|---|
| 2,971,814 | 2/1961 | Seligsberger | 99—176 X |
| 3,123,481 | 3/1964 | Seiler | 99—176 |
| 3,123,482 | 3/1964 | Lieberman | 99—176 |
| 3,194,865 | 7/1965 | Fagan | 99—176 X |
| 3,425,847 | 2/1969 | Talty | 99—176 |

FRANK W. LUTTER, Primary Examiner

R. HALPER, Assistant Examiner

U.S. Cl. X.R.

264—202, 209